United States Patent
Shaw (10) Patent No.: US 8,064,716 B2
(45) Date of Patent: Nov. 22, 2011

(54) APPARATUS AND METHODS FOR ENHANCING DIGITAL IMAGES

(75) Inventor: Rodney Shaw, Aptos, CA (US)

(73) Assignee: SoundStarts, Inc., Aromas, CA (US)

( * ) Notice: Subject to any disclaimer, the term of this patent is extended or adjusted under 35 U.S.C. 154(b) by 1058 days.

(21) Appl. No.: 11/552,666

(22) Filed: Oct. 25, 2006

(65) Prior Publication Data

US 2007/0104384 A1   May 10, 2007

Related U.S. Application Data

(60) Provisional application No. 60/735,053, filed on Nov. 8, 2005.

(51) Int. Cl.
*G06K 9/40* (2006.01)

(52) U.S. Cl. .......................... 382/274; 382/167

(58) Field of Classification Search .................. 382/167, 382/274
See application file for complete search history.

(56) References Cited

U.S. PATENT DOCUMENTS

| | | | | |
|---|---|---|---|---|
| 4,394,688 A * | 7/1983 | Iida et al. | | 348/28 |
| 4,568,978 A * | 2/1986 | Cosh | | 348/676 |
| 5,408,267 A * | 4/1995 | Main | | 348/254 |
| 6,704,725 B1 * | 3/2004 | Lee | | 1/1 |
| 2002/0118889 A1 * | 8/2002 | Shimizu | | 382/274 |
| 2003/0108223 A1 * | 6/2003 | Prokoski | | 382/115 |
| 2003/0128877 A1 * | 7/2003 | Nicponski | | 382/224 |
| 2004/0213457 A1 * | 10/2004 | Mori | | 382/167 |
| 2005/0286772 A1 * | 12/2005 | Albertelli | | 382/224 |
| 2010/0142847 A1 * | 6/2010 | Moon et al. | | 382/274 |

OTHER PUBLICATIONS

Ben Willmore, Adobe Photoshop CS Studio Techniques, pub Feb. 2004, Adobe Press.*
Adobe Photoshop CS Help Manual, "Using the Variations command".*
Adobe Photoshop Release History, Wikipedia.*

* cited by examiner

*Primary Examiner* — Wesley Tucker
*Assistant Examiner* — Mark Roz
(74) *Attorney, Agent, or Firm* — Donald R. Boys; Central Coast Patent Agency, Inc (57) ABSTRACT

A method for enhancing a digital image involves selecting an image as an original image to be enhanced, creating by a pixel mapping procedure at least two images altered from the original image in a first image attribute, each of the altered images differing in the first image attribute, displaying the altered images to a user, and selecting by the user one of the images displayed as preferable to the other images displayed.

8 Claims, 12 Drawing Sheets

APPARATUS AND METHODS FOR ENHANCING DIGITAL IMAGES

BACKGROUND OF THE INVENTION

1. Field of the Invention

The present invention is in the area of digital imaging, and pertains more particularly to apparatus and methods for enhancing and improving digital images, in particular by unskilled consumers.

2. Discussion of the State of the Art

Typically the visual enhancement of digital images is performed using software packages that involve a variety of photo-editing techniques and algorithms. These may involve the user in procedures such as defining the values of a set of control parameters, moving variable sliders, manipulating adjustable-curves, or pressing 'try-this' buttons that incorporate specialist algorithms. All these may work to a greater or lesser extent, but by virtue of their user—and/or their computational—complexity, they remain largely the province of the professional or advanced and experienced user, and beyond the technical capabilities of the greater proportion of potential users.

An additional drawback is implicit in the menu-driven approach to most photo-editing and enhancement software tool-sets. In fact both the statistical image-quality attributes, and hence their physical surrogates within the image pixel-parameters, are generally each interconnected to each other, since they are neither independent nor commutable. Thus both the magnitude of the image-manipulation due to the adjustment of a particular parameter, and the order in which it is applied to the digital image, is generally of unspecified hierarchal importance: each adjustment may partially undo the effects of one or more previous adjustments. Therefore, in general only a skilled operator with experience can establish comprehensive image-enhancement recipes minimizing such interacting problems, such recipes typically being based on experimentation with many digital images.

A further complication in many existing image enhancement methodologies arises from an attempt to provide global algorithms, either to embed in the hardware of acquisition devices or to incorporate in user software. The demands made on these algorithms, simultaneously adjusting all or many of the basic image-quality parameters, are such that they typically operate only conditionally on pixels, where these conditions are determined by various collective attributes of defined sets of other local pixels. All such conditional pixel operations themselves inevitably introduce their own image signature to the enhanced image, and this signature often shows in the form of new and undesirable image-quality defects introduced by the algorithms themselves. Some of the more obvious of these defects manifest themselves as image-contouring, haloes, pronounced 'ringing' and dark-lines at boundaries of image detail, post-enhancement local color-misbalances, the presence of image-regions of excessive noise, and so on. User attempts to optimize the visual image-quality may thus call for a delicate balancing act between enhancing natural image-quality parameters and the simultaneous introduction of new and unintended but inevitable image defects.

On the other hand, the number of consumer digital images existing for example from digital cameras and cell-phones, photo-scanners and the web, continues to proliferate at a very high, and increasing rate, and a majority of these images could readily be enhanced to the user's benefit and satisfaction, if a truly user-friendly enhancement methodology were readily available, which does not suffer from the drawbacks described above.

While there seems to be considerable content in the art concerning photo-editing techniques and algorithms, covering but not limited to brightness and darkness variations, tone and contrast adjustments, and the balance of the image color-components, and while these techniques and algorithms may involve a host of manipulations on the basic constituents of the digital image (for example, the pixel-histogram, its extent, distribution and other statistics, and the relative color components of the pixels), there is art known to the present inventor concerning a methodology whereby users are presented with a choice of automatically-selected enhancements to their pictures; wherein a first choice may lead naturally to a next best choice, and so on; and where a short series of such choices may lead rapidly to a picture optimized for image quality according to the personal visual preferences and criteria of the user.

One reason for the many difficulties described concerns complexity of components defining image quality and their statistical representation in pixel-array properties, and the very large number of combinations of these components. For each image, with its own peculiarities of scene composition and lighting, digital-acquisition devices must in effect make a technical estimate of the combination of those image-quality properties and combinations most likely to satisfy the user. Likewise, after-the-fact software packages typically make implicit assumptions of these same properties, and then present a system of controls whereby the user may attempt to obtain simultaneous preferential values of all these properties.

A quantitative estimation of the scale of the problem described above can be established as follows. If one considers quite basic image-quality variables of image brightness and darkness, tone and contrast, and contributions made by color components of the image, and if further one devises a linear scale for basic image variables, and within this scale defines increments of user image-quality discrimination, then for any image such an exercise leads to an estimated number of magnitude typically in excess of one-hundred-thousand possibilities for all combinations of these fundamental variations. Thus, just as image-acquisition devices (for example, digital camera or scanner) must in effect attempt a best technical guess at an optimum combination from amongst this very large number, so does any remedial software when the acquisition technology is sub-optimum in any or all of these image aspects. The chance of this guess being best is remote.

An entirely novel approach would be one of presenting the user with each of the very large number of possible images, and letting the user make an individual choice of the optimum preferred image-quality based entirely on personal preference. If this could be done efficiently, the practical need for a menu of enhancement techniques as described above would largely disappear. A practical reason this approach has not previously been pursued is implicit in the above estimation for the large number of practically distinguishable image choices (that is, typically in excess one-hundred thousand). Note that calculation of this number itself involves definition and separation, linear-visual-scaling, interval-determination and combinatory calculation of basic image variables. This exercise presents a formidable task in itself, and has no known coverage in the prior art for practical digital images, to the knowledge of the present inventor. One approach in an aspect of the present invention includes methodology for practical determination of a number of individual image combinations, or a number of possible image quality states for any single original digital image.

Having established a number of independent image quality states, the problem of presenting these states for user-selection seems at first consideration to be formidable. For example, automatically printing in excess of, say, one-hundred-thousand prints representing each state, and letting the user make a choice, would be clearly prohibitive in time and cost, while displaying them in electronic form, for example on a computer monitor, would seem not only to be costly in time but tedious and confusing to the user.

What is clearly needed is a simple, practical digital-image enhancement procedure, yet one that overcomes the existing problems and complications associated with conventional software systems, while at the same time removing obvious barriers to practical application.

SUMMARY OF THE INVENTION

In one embodiment a method for enhancing a digital image is provided, comprising steps of (a) selecting an image as an original image to be enhanced, (b) creating by a pixel mapping procedure at least two images altered from the original image in a first image attribute, each of the altered images differing in the first image attribute, (c) displaying the altered images to a user, and (d) selecting by the user one of the images displayed as preferable to the other images displayed.

In a preferred embodiment the pixel mapping procedure applies a continuous function relating original pixel value for an attribute to an altered pixel value, and differing altered images are created by changing value for a constant in the function between mapping procedures. In some embodiments values for the constant are changed in a preprogrammed incremental fashion. In some embodiments the first image attribute is one of brightness, contrast, or color.

In one embodiment there is a further step (e) treating the preferred image from step (d) as a new original, and repeating steps (b) through (d) to produce a new preferred image. In some embodiments all of the pixels of the original image are mapped, and in some embodiments a subset of the original pixels are mapped, and those not mapped are deleted entirely in the altered image.

In some embodiments steps (b) through (e) are repeated. Also in some embodiments, in step (b) after step (e) a second image attribute is selected by the software, and all altered images are altered in the second image attribute. Still further, in some embodiments, in step (b) after step (e) a third image attribute is selected by the software, and all altered images are altered in the third image attribute as well.

In some cases selecting a second image attribute in step (b) is triggered by the user selecting an unchanged image as the preferred image.

In another aspect of the invention a system for enhancing a digital image is provided, comprising a software suite executing on a computerized appliance including a display, and input apparatus coupled to the computerized appliance and operable by a user. In this system an image is selected as an original image to be enhanced, the software creates by a pixel mapping procedure at least two images altered from the original in a first image attribute, each of the altered images differing in the first image attribute from one another, the altered images are displayed to a user in an interactive display, and the user selects one of the images displayed as preferable to the other images displayed.

In a preferred embodiment of the system the pixel mapping procedure applies a continuous function relating original pixel value for an attribute to an altered pixel value, and differing altered images are created by changing value for a constant in the function between mapping procedures. Also in a preferred embodiment the values for the constant are changed in a preprogrammed incremental fashion.

In some embodiments the first image attribute is one of brightness, contrast, or color. Also in some embodiments there is a further step (e) treating the preferred image from step (d) as a new original, repeating steps (b) through (d) to produce a new preferred image.

In some embodiments all of the pixels of the original image are mapped, and in other embodiments a subset of the pixels may be mapped, and those pixels not mapped may be discarded completely for the altered image. In some cases steps (b) through (e) may be repeated.

In some embodiments, in step (b) after step (e) a second image attribute may be selected by the software, and all altered images are altered in the second image attribute. Further in step (b) after step (e) a third image attribute may be selected by the software, and all altered images are altered in the third image attribute.

In some cases selecting a second image attribute in step (b) is triggered by the user selecting an unchanged image as the preferred image. Also in some cases the first image attribute is brightness, the second image attribute is contrast and the third image attribute is color.

DETAILED DESCRIPTION OF THE INVENTION

In one embodiment the present invention comprises a computerized system and methods for enhancing and optimizing a digital image under control of a user. The digital image may originate from any source, including but not limited to digital photography, scanned analog prints or documents, downloaded web images, cell-phone captured digital photographs, and the like. The system and method is applicable to any imagery expressed in an array of pixels.

In practicing the invention, in one embodiment a user causes, through an interactive application exhibiting user-friendly methodology, a serial and systematic sequence of operations to be performed on an original image, wherein specific attributes of the image, such as brightness/darkness, contrast/tone-reproduction, and color reproduction, are improved incrementally, resulting in an overall optimized image. The invention is not limited to the attributes described just above, and may be extended to more sophisticated image attributes, as appropriate and convenient in any practical case.

In one embodiment basic image attributes and pixel mapping surrogates have been implemented such that their effects are largely independent of one another, and the enhancement of attributes has been ordered such that, for typical images, major image changes are applied first, and lesser changes are applied later.

The methodology of the invention in one embodiment is based on a definition of linear visual scales for each image attribute, and determination of scale increments corresponding to just-appreciable visual differences (denoted herein as JAVDs). In terms of these combined attributes and their corresponding JAVDs, a very large number of separate image states may be defined, and the user, in this embodiment, is presented with a simple choice of associated images according to personal preference. In electronic form, for example as presented on a display monitor, this choice might typically be made in a very short period of time, within a matter of seconds or so, for example, by means of a rapid sequence of clicks on a succession of altered images presented to the user, until the final overall preferred enhancement has been selected.

Figure 1:
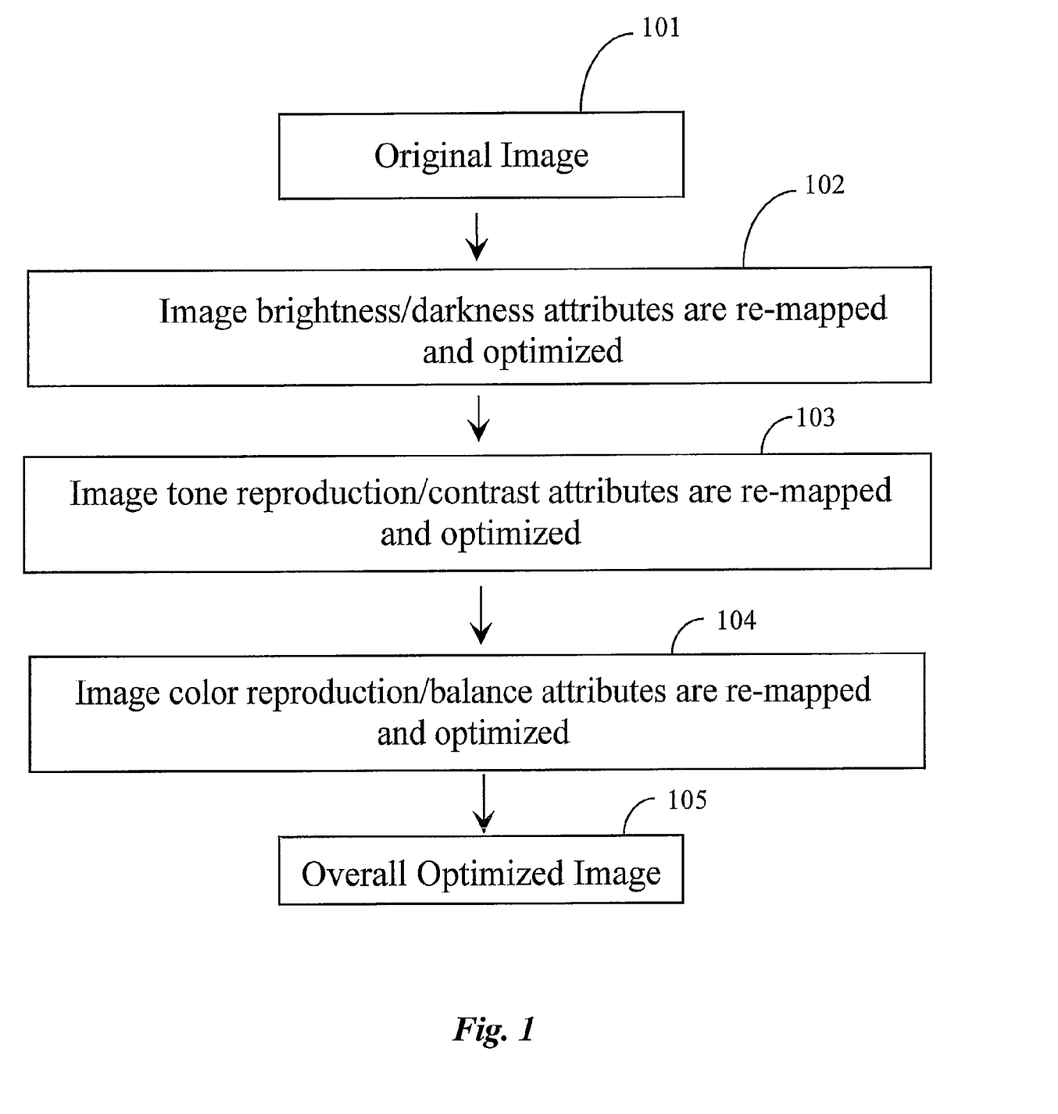
FIG. 1 is a flow chart depicting a series of steps and functions to successively enhance a digital image in one embodiment of the present invention.

FIG. 1 is a flow chart depicting a series of steps and functions to successively enhance a digital image in one embodiment of the present invention. In this example the user starts with an original image 101, which, as described above, might come from any source. At step 102 image brightness/darkness attributes are mapped and optimized. At step 103 image tone-reproduction/contrast attributes are mapped and optimized. At step 104 image color-reproduction/balance attributes are mapped and optimized. An overall image optimized by preference emerges at step 105.

As is described in enabling detail below, each of the steps in the process flow chart of FIG. 1 comprises a series of sub-steps, based in one embodiment on a methodology that starts with one image, and creates at least one, but typically four or more altered images, with the alteration carried out in a systematic way. At first step 102 the methodology is applied to brightness/darkness attributes of the image, producing, for example, four altered images, two of which are brighter, and one of those two brighter than the other, and two of which are darker, and one of those is darker than the other. These altered images are presented to the user, along with the original, and the methodology allows the user to quickly select the one of the altered images (or the original) judged to be best. The system then considers the selected image as a new starting point, and again prepares four altered images deviating from the new standard in a systematic way, and the user again chooses from among the altered images based on user preference.

Because the process is designed to enhance images by characteristics judged best by the user, the period of iteration is relatively short, and the user and the system arrive at the user's best selection of brightness/darkness for the image in just a few selections—a few clicks if the system is set up to select by clicking on a displayed image, or perhaps an icon representing an altered image. Now the method moves on to contrast, and the process repeats; then to color, and repeats again, and the end result is an image enhanced according to the desires of the user.

Each overall step in the process described by FIG. 1 involves, as previously mentioned, a number of internal steps. Digital display technology involves, as is well-known in the art, an assortment of digital values for each pixel. For a single pixel, therefore, there may be, for example a value for brightness, and different values for color characteristics, depending on a particular digital protocol or standard. Depending on protocol used, for each pixel for each attribute there will be a minimum value and a maximum value. In providing alternative values for pixels in the iterative process described with reference to FIG. 1, it is desirable that a new pixel value not fall outside the defined value range for the particular attribute. So if the range is zero to 255, for example, we do not want to generate pixel values having negative numbers or values greater than 255.

Figure 2:
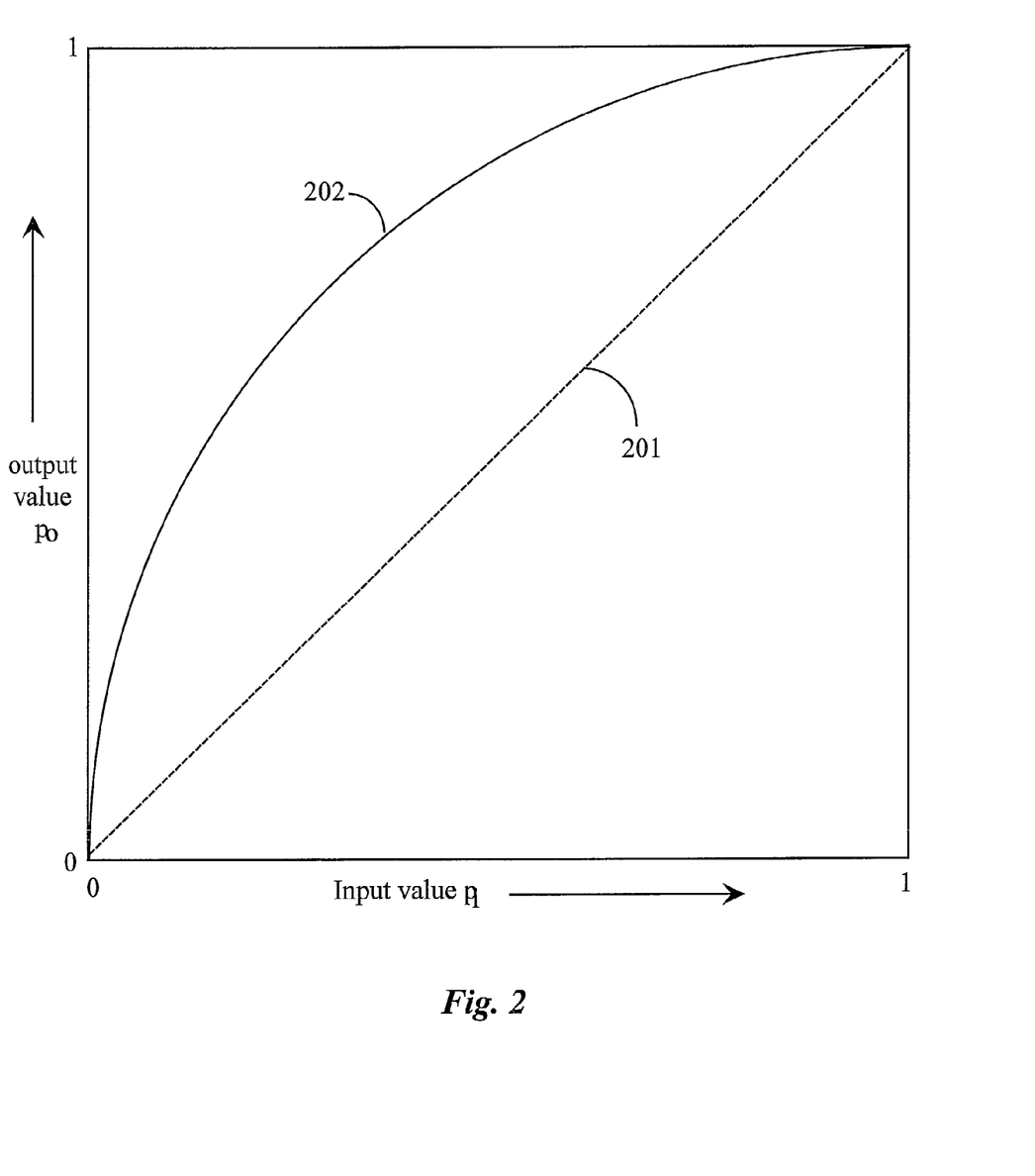
FIG. 2 illustrates a pixel mapping function in an embodiment of the invention intended to lead to enhancement of the image according to one attribute of the image.

FIG. 2 illustrates an example of a pixel mapping function wherein value of input pixels, $p_i$, are systematically changed to output pixel value, $p_o$. Pixel values are normalized in this example to a range from 0 to 1. Whereas in the practical case the (un-normalized) range is typically 0 to 255 (that is, for so-called 8-bit images), the pixel mapping methodology here is independent of this practical range, and might for example equally be applied in the same functional manner to any pixel range, including but not limited to, 16-bit or 32-bit images.

FIG. 2 is simply a graphical representation of a mapping function, which, applied to an initial pixel value $p_i$, provides a new pixel value $p_o$. If the particular function selected and used causes no change in value, regardless of the initial value, the new pixel has the same value as the old, and that function is graphed as a straight line 201 with a forty-five degree slope. This function is $p_o = p_i$.

As stated above, in the methodology of the invention in one embodiment it is desired that output pixel values lay in the same range as the input pixel values, in this case lowest value zero, highest value 1. But it is also desired that, in the case of brightness, that the new values produce either an overall brighter or an overall darker image. Curve 202 is a graph of a function that if used to remap every pixel in the original image, would satisfy both the end-points constraint (0 and 1) and produce a brighter image in a smooth and continuous manner. A function that would produce this curve would be single-valued and continuous.

Figure 3:
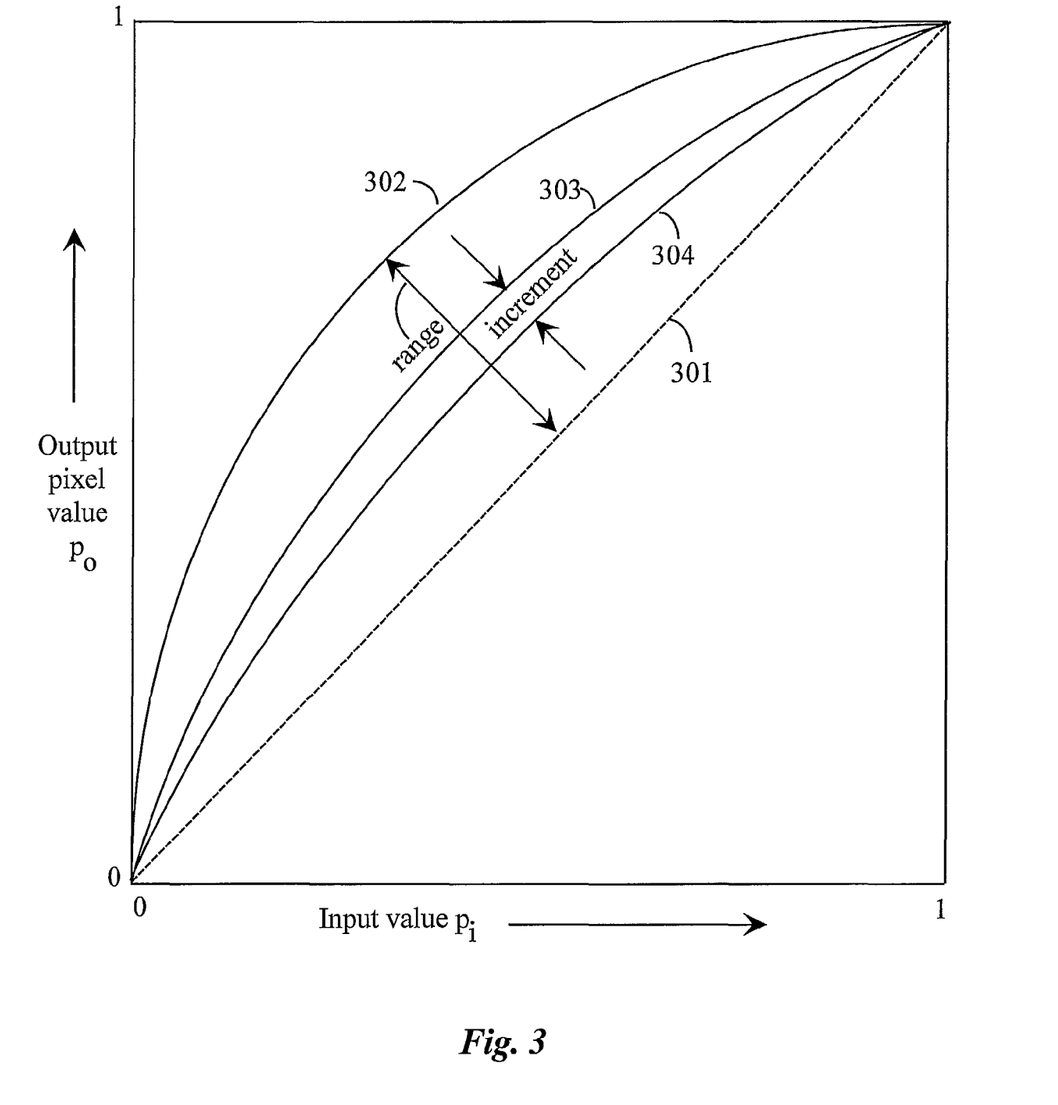
FIG. 3 shows a family of curves in an embodiment of the invention to increase an attribute of an image, and to illustrate concepts of an overall practical range and visual increment of curves in the family.

FIG. 3 extends the brightness-enhancement functionality described thus far to a series of enhancements, all based on a single mapping function wherein different effects may be produced based on a parameter change within the function. The system, in one embodiment, produces enhanced images within a practical range for such brightness changes, indicated as the range between the function $p_o = p_i$ (line 301) and curve 302, wherein the resulting image will be substantially brighter. The image produced by the formula described by curve 302 is considered to be brighter than the original by a maximum practical change.

While any curve may be generated between these two extremes, only a finite family of such curves may be appropriate in a practical sense, based on the concept introduced above of just-appreciable visual differences (JAVDs), whereby the typical user might be insensitive to and/or unconcerned by lesser associated image brightness changes produced from one curve to the next. This concept of a basic increment as a JAVD between curves is illustrated by the adjacent curves (303 and 304), assumed separated by a single JAVD.

One potential pixel mapping function satisfying all the requirements for a complete practical range of brightness transformations is of the general form:

$$p_o = p_i/(1-c+c\,p_i) \tag{A}$$

where $p_i$ and $p_o$ denote the normalized input and output pixel values, respectively. Note that for c=0, $p_o=p_i$, producing the straight line function graphed as curve 301. Note also that for c=1, $p_o=1$ for any value of $p_i$. This function is well-behaved for c varying between 0 and 1. So function (A) is a potentially viable candidate, constraining c to be equal to or greater than zero, and equal to or less than one, for mapping pixels in an image to produce an altered image with a smoothly mapped difference and without producing pixel values outside an allowable range.

While function (A) may be effective in making controlled overall changes to pixel attributes, such as brightness, it is non-linear with the visual impression of brightness in that equal changes in the variable parameter c do not lead to the visual impression of equal changes in image brightness. In order to deal with this characteristic, in one embodiment a transforming function for the value of c is defined based on practical viewing experience with very many typical digital images. For example, in one practical embodiment of the invention the transformation from the natural parameter c to a linearly visual scale, $c_V$, was performed using the equation:

$$c = 1 - (1-c_V)^{2.85} \tag{B}$$

This parameter $c_V$ itself has the same natural range between 0 and 1, as c varies between 0 and 1.

The practical increments of the JAVDs along the linearly visual scale, $c_V$, are similarly determined from viewing experience with very many digital images. For example, in one practical embodiment of the invention, the increment (see FIG. 3) was established as 1/32, and the natural range of the pixel mapping function that permitted brightness changes appropriate to the majority of a large number of digital images was established at 14 such increments. Thus the curves as illustrated in FIG. 3 would form a series defined by $$c_V = 1/32, 2/32, 3/32, 4/32, 5/32, 6/32, 7/32, 8/32, 9/32$$
$$10/32, 11/32, 12/32, 13/32, 14/32.$$

Values of $c_V$ falling beyond 14/32 were found to be necessary for appropriate brightness change in only a very small percentage of all practical sample sets of digital images, and in these cases the series can readily be extended. Similarly, the interval itself, or JAVD, may be modified according to individual choice for any specific type of digital-image sample set, or any criteria.

It should be understood that function (A), or any other appropriate pixel mapping function that might yield a similar series of curves separated by JAVDs, as illustrated in FIG. 3, should operate equally or as appropriate on all sub-components within the image pixels. These may typically be associated with but not limited to color systems having defined RGB components, or to grayscale images or any other practical form of digital-image classification and expression, or any other color classification system.

Figure 4:
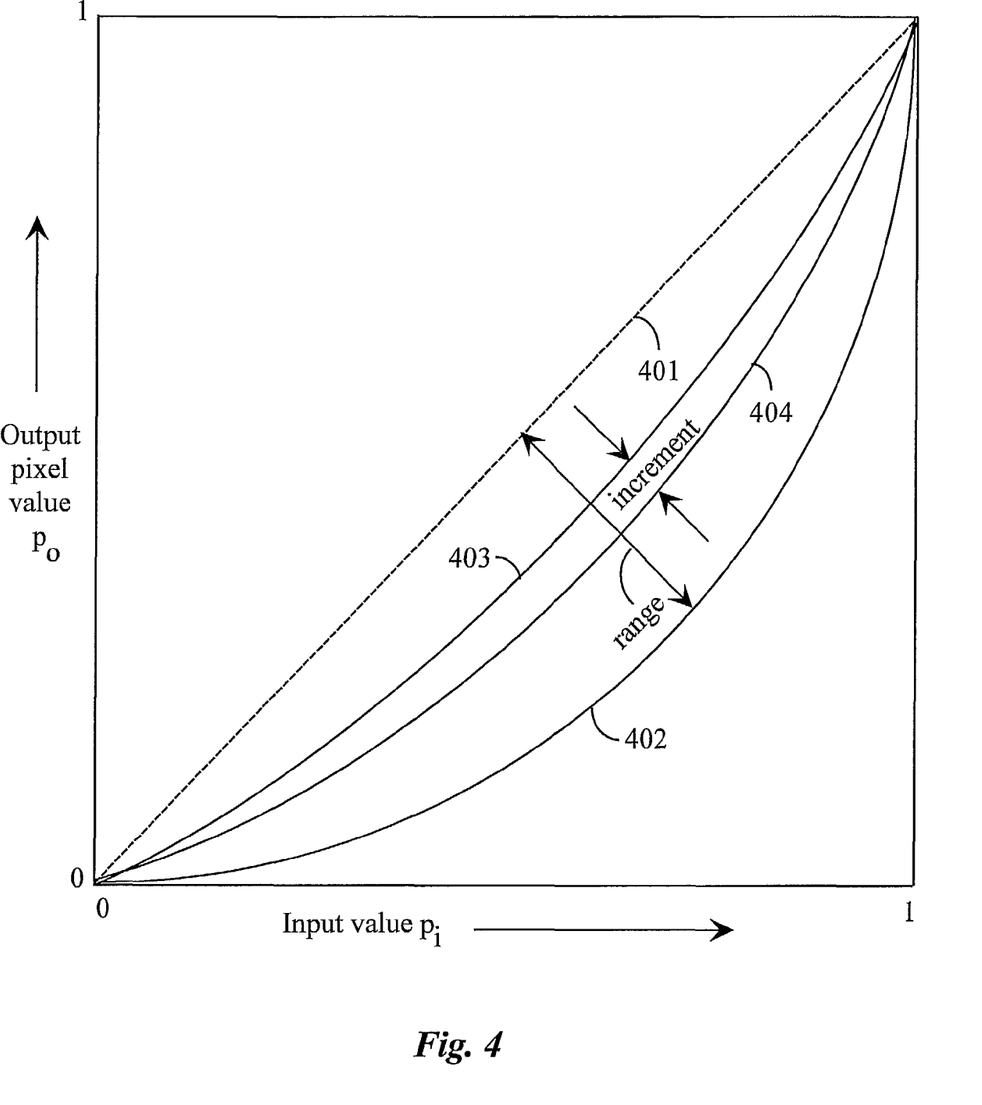
FIG. 4 shows a family of curves in an embodiment of the invention to decrease an attribute of the image, and illustrates concepts of overall practical range and visual increment of curves in the family.

Note that the function graphed with various values of c in FIG. 3 is entirely symmetrical about the line defined by the curve (straight line) defined by $p_o=p_i$, and its mirror-image about this line results in a set of new curves as illustrated in FIG. 4. Such a mirror image might for example be generated by replacing the function (A) by:

$$(1-p_o) = (1-p_i)/(1-c+c(1-p_i)) \tag{C}$$

For each of the new curves of FIG. 4 there is a systematic reduction in output pixel value for each input pixel value, and thus for typical practical cases the image will be darkened in an overall manner depending on the specific mapping function chosen from within this family. Thus an output image may be rendered between the original image through increments of JAVDs by mapping pixel values using functions such as those graphed as curves 403 and 404, through to some determined practical darkness limit (curve 402).

Figure 5:
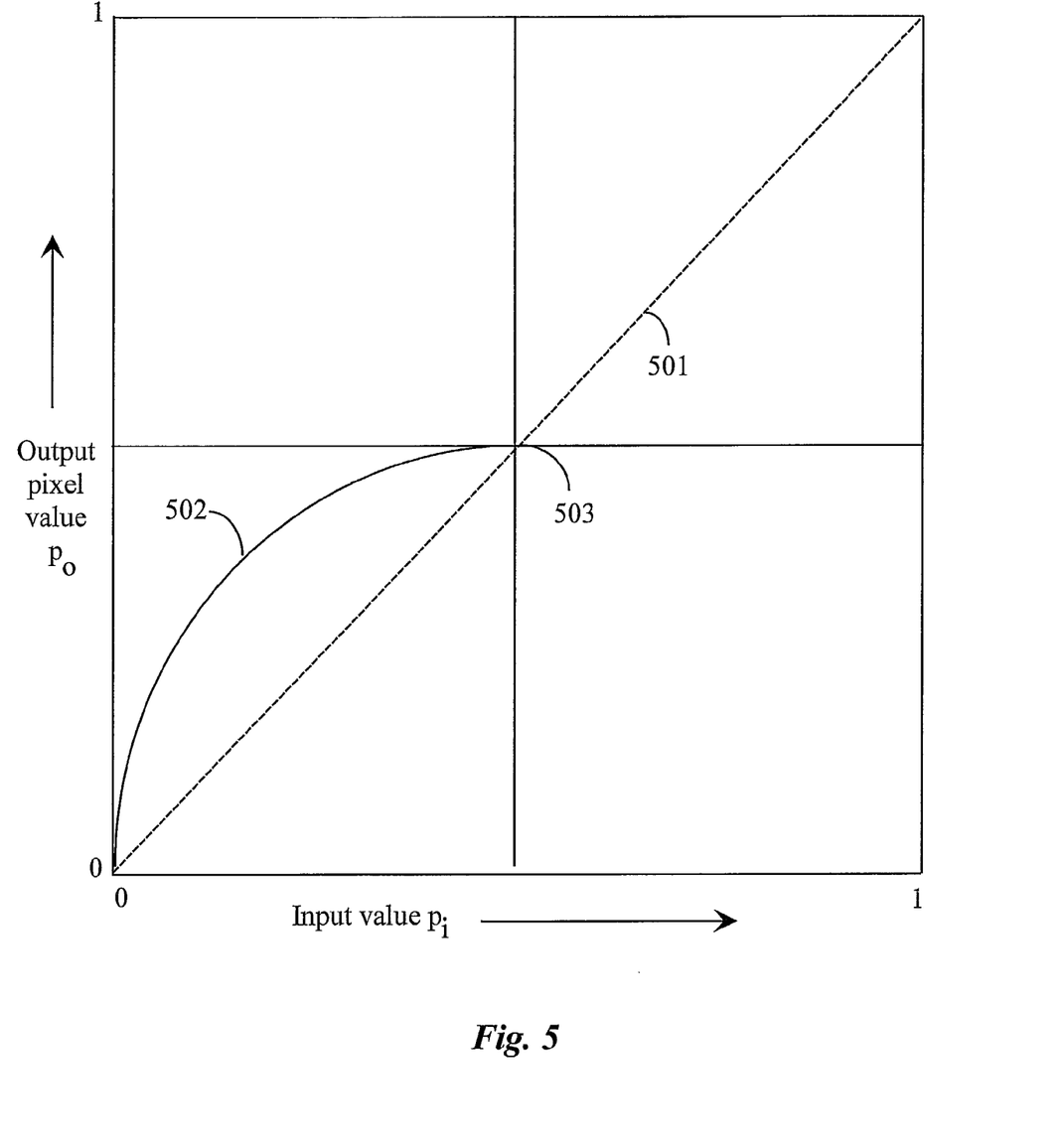
FIG. 5 illustrates use of a pixel mapping function in an embodiment of the invention to increase an attribute over a defined portion of a pixel range.

It should be noted that the same pixel mapping function described above, or any similar function, might be used to map any specific region of the overall pixel range of the image. FIG. 5 shows an example of this, wherein the mapping function 502 is employed only between 0 and a midpoint 503 along the curve representing the original image (line 501). Point 503 might for example be taken as half-way along the pixel range, but the invention is not restricted to this assumption, and this point might be varied in light of practical convenience and user experience. In fact, any region of an image might be selected and mapped separately from the rest of the image.

Figure 6:
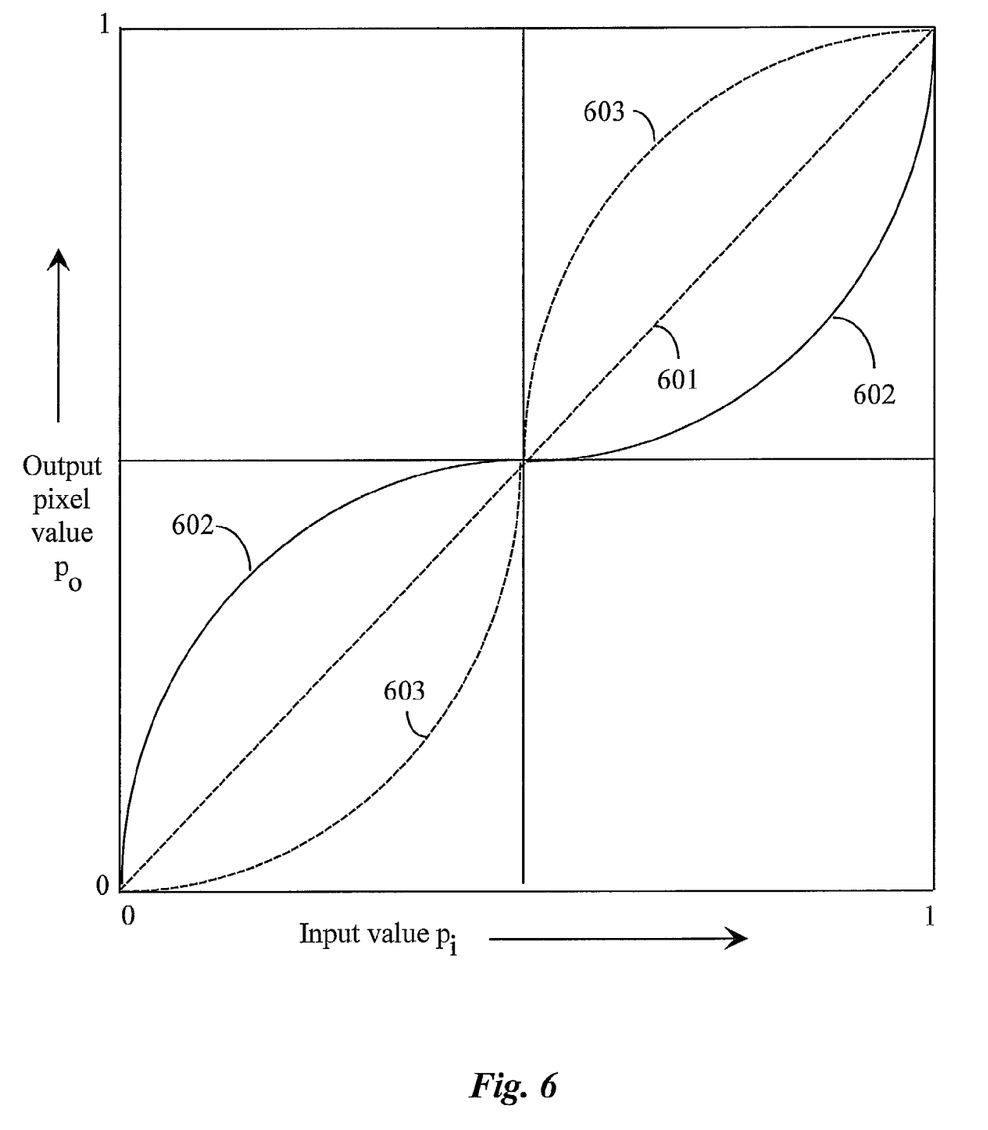
FIG. 6 illustrates two pixel mapping functions in an embodiment of the invention, each using opposite functions over different portions of a pixel range, where one will increase the image attribute, while the other will decrease the image attribute.

FIG. 6 illustrates extension of partial pixel-range mapping to the complete pixel range of an image by taking the mirror-image of the function and re-scaling to the remainder of the pixel range. Curves 602 (solid) and 603 (dashed) respectively show two examples of such curves having opposite curvatures within the two separate upper and lower pixel ranges. Note that curve 602 implies lightening of the image for the lower pixel range, and darkening for the higher pixel range, while curve 603 implies the converse, namely darkening in the lower pixel-range and lightening in the higher range.

Note that lightening of a dark region and darkening of a light region is generally referred in tone reproduction art as contrast-reduction, and vice versa. Thus the use of pixel mapping curves such those of 602 and 603 allows for generation of image states having specified changes in contrast, and an associated property known as tone reproduction. Note also that the complete curves of 602 and 603, based on the same functional form as the originating function (A), retain the same desirable properties for smooth image transitions during pixel mapping (single-valued, continuous), and also similarly and naturally constrain the mapped image to its original lower and upper pixel bounds.

Figure 7:
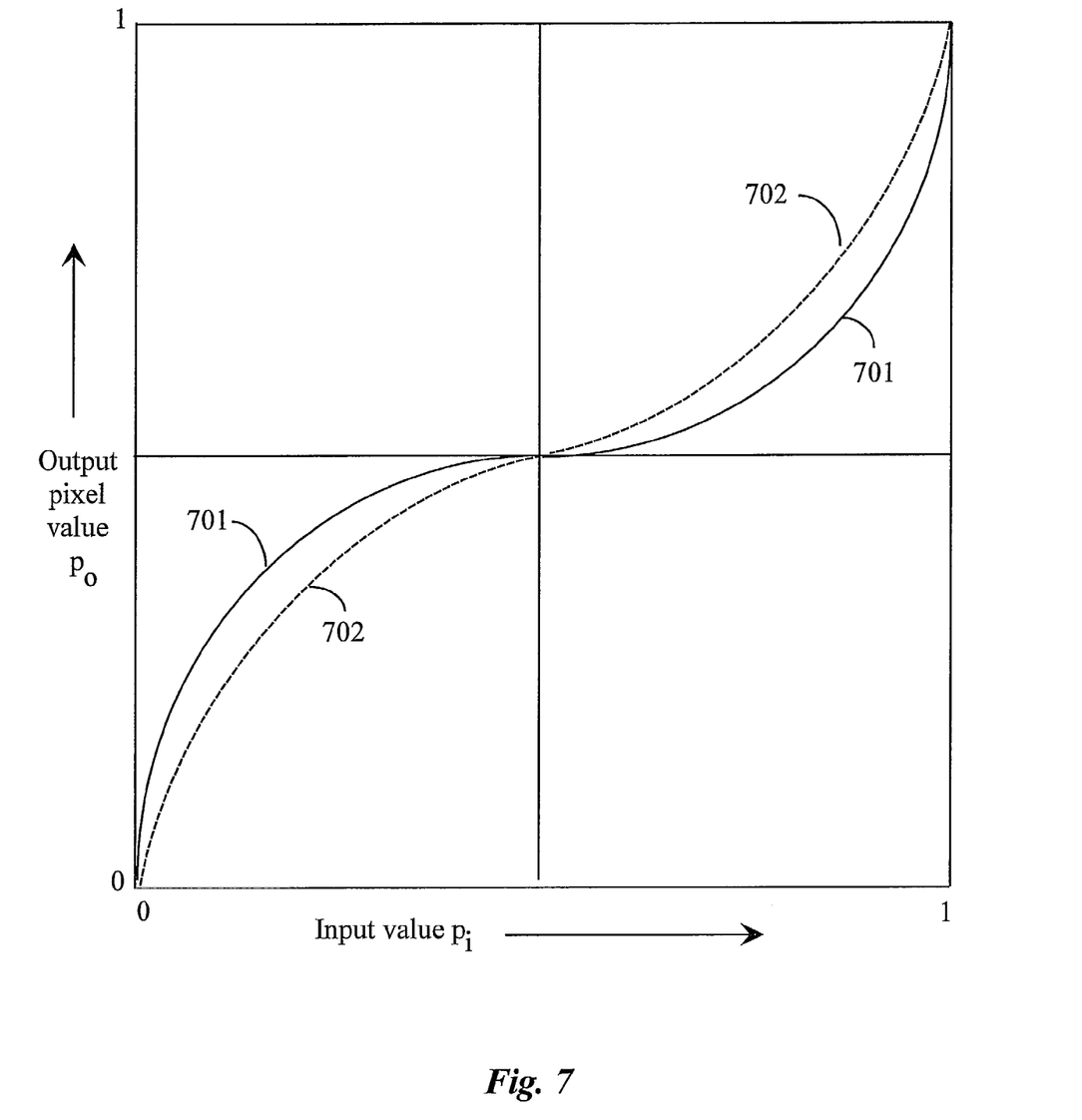
FIG. 7 shows two curves in an embodiment of the invention each decreasing overall image contrast, and illustrates a concept of visual increments in image contrast.
Figure 8:
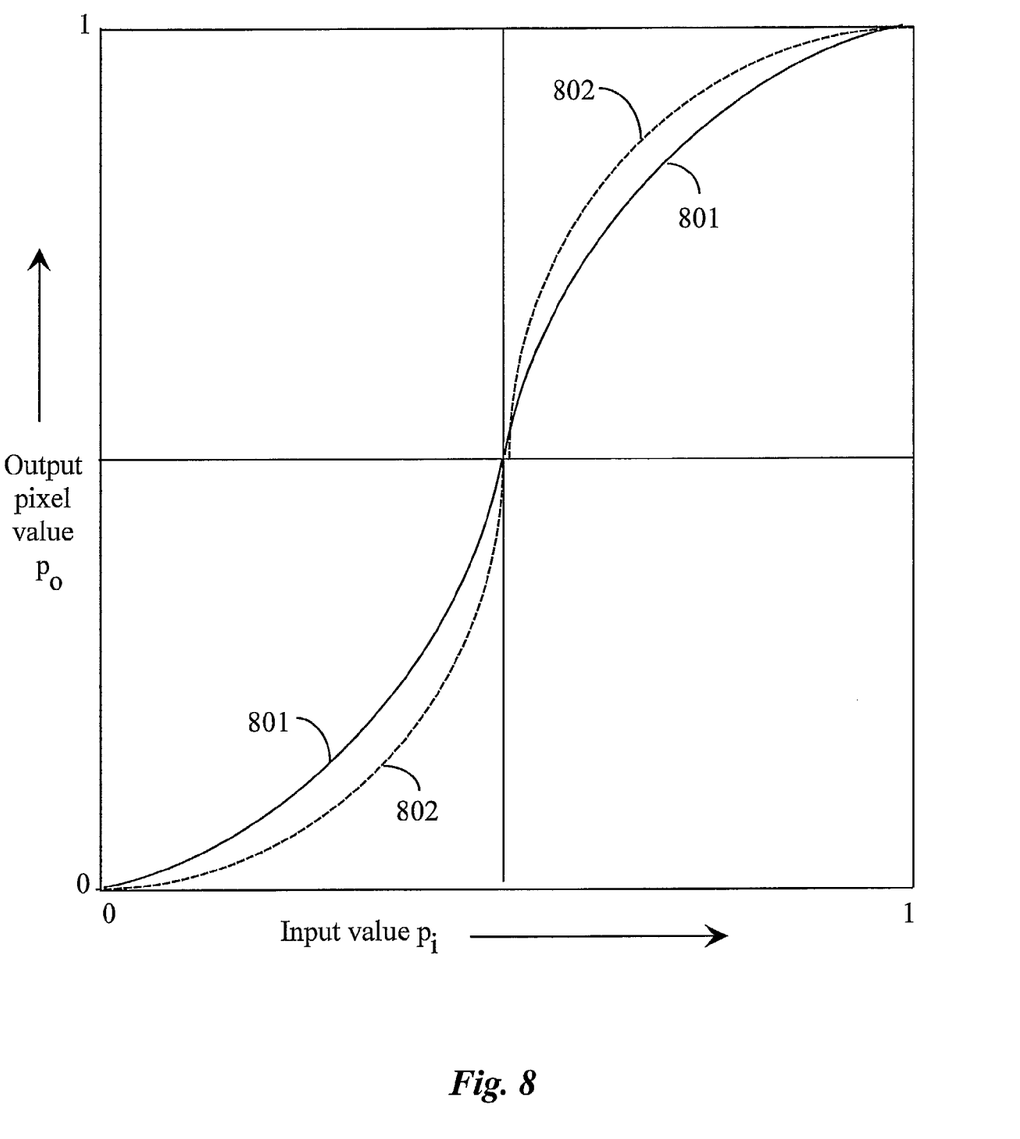
FIG. 8 shows two curves in an embodiment of the invention each increasing an attribute, and illustrates a concept of visual increments in image contrast.

Having illustrated the use of a basic pixel mapping function to affect changes in image tone and contrast, FIGS. 7 and 8 show a similar use of finite increments, or JAVDs, representing minimum practical decreases in image contrast (FIG. 7) and increases in image contrast (FIG. 8), respectively. It is thus understood that all descriptions above concerning image states associated with brightness/darkness, their range and JAVDs, are also directly applicable to image states associated with increase or decrease in contrast. FIG. 7 illustrates a first mapping function 701 to be used to map pixels to create a first altered image with increased contrast from an original image, and a second mapping function 702, created by changing a constant in the function, to create a second altered image with increased contrast, having characteristics changed by a JAVD from those of the first altered image. FIG. 8 illustrates a first mapping function 801 to be used to map pixels to create a first altered image with decreased contrast from an original image, and a second mapping function 802, created by changing a constant in the function, to create a second altered image with decreased contrast, having characteristics changed by a JAVD from those of the first altered image.

Figure 9:
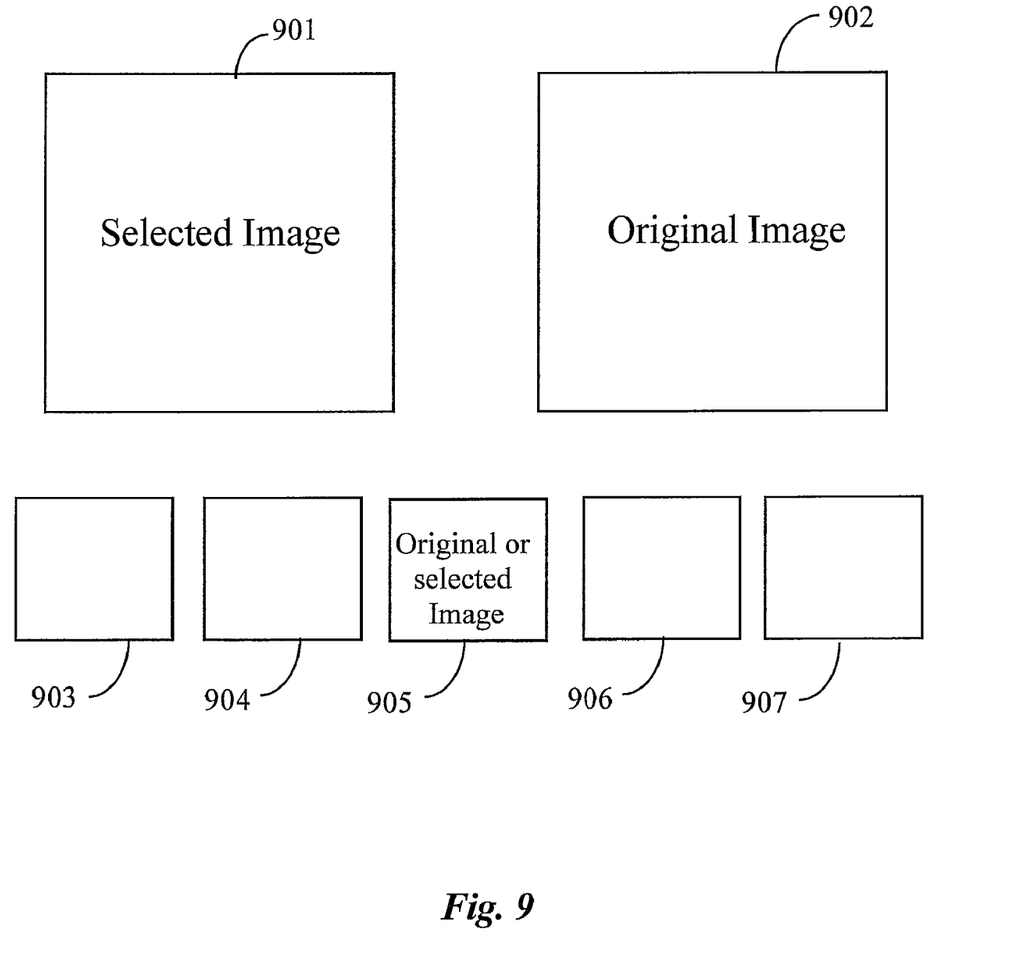
FIG. 9 illustrates in an embodiment of the invention using of a series of images with altered attributes for selection as preferable by a user.

FIG. 9 illustrates a practical embodiment of a user-choice system for enhancing an image according to user-selected changes in image characteristics such as brightness/darkness and tone/contrast. To practice the invention in this embodiment, images might be displayed on a computer screen, and functionality of the system may be provided through software executing on the computer. This is not a limitation, however, because images might be displayed on a display of a digital camera, a display coupled to a printer or a copy machine, or in a variety of other combinations, and any of these alternative computerized appliances may be capable of executing the requisite software.

In the system illustrated by FIG. 9 an original image 902 is displayed beside a same-size image 901, which represents a selected enhanced image at incremental stages in the image enhancement process provided by the system. In an alternative embodiment, only one larger image may be displayed, and that is, in the beginning, the original image, which is replaced at each step in the iterative process by the selected enhanced image at each stage, step-by-step.

Below the two larger images 901 and 902, a row of smaller images, sometimes referred to as thumbnail images, in this case five, labeled as images 903, 904, 905, 906, and 907 are shown. Image 905 is, at the start, the original image. Images 903 and 904 are two images altered in one direction for a particular attribute, for example, brightness, by mapping the original image, pixel-by-pixel, using a function as described above. In one embodiment images 904 will be an image brightened by a JAVD, and image 903 an image brightened from the original to provide a brighter image than image 904 by a JAVD. On the other side of image 905, image 906 is an image darker than the original, produced by a function as described above, and image 907 is a second darker image separated in characteristics from image 906 by a JAVD.

In one embodiment practice of the invention proceeds by a user entering an image for enhancement. This may be done, for example, from an interactive display provided by the software by reviewing stored images, and selecting one to load. Once the original image is selected, in this embodiment that image is displayed as 902 in the array of FIG. 9 in the interactive display, and also as center image 905. The system, in parallel with displaying the original image, maps the original into four altered images, and displays the four altered images as described above with reference to FIG. 9.

It is the user's task to review the four altered images, and to select one that the user denotes the best improvement (if any). If the user sees no improvement, there will be a "Done" choice available to end the process, and the image remains unaltered. In some embodiments, selection of the unchanged image 905 triggers an end to the particular phase of the operation, that is: Done.

In various embodiments the functionality may vary somewhat. For example, the user is expected to select the best image, in his or her opinion, from the thumbnail images below the larger image or images. In one embodiment a mouseover of any one of the altered images offered for selection causes that image to display larger as image 901, greatly facilitating the selection process, because the user can now see the change in a larger, more detailed format. As long as the cursor remains over the thumbnail image, the image displays as the larger image. Also in some embodiments there will be only one larger image at the top, which is the original image at the start, the mouseover image during the selection procedure, and the selected image once the user selects one image as the best of the selectable images.

As the user selects the one image judged to be the best change, that selected image then displays as 901, or as the one larger image, and takes center stage as image 905. The original image remains as 902 for before-and-after effect in some embodiments. The system now produces four more images, using the pre-programmed functionality described, and importantly, these new four images differ in the salient characteristics, in this case brightness, by differences on either side of the already enhanced image. Now the user selects again, and the newly selected image takes its place in the appropriate positions 902 and 905.

In some embodiments there may be just one image in the interactive display, which is the original image at the start, and in proximity to the image there may be a scale or a row of icons, rather than altered images. In this embodiment the system produces candidate choices based on a mapping formula, just as before, but does not display the choices as images, but as associated icons or positions on a scale. As the user mouses over the scale or icons, the one image changes according to the mapping already performed by the system. And, as the user selects a position on the scale or an icon, the system displays that image, and immediately calculates another set of images and associates these new altered images with the icons or scale.

As a practical matter, this process provides brightness according to the personal preference of the user, in at most about three selections, which may be mouseovers, or clicks by a pointer device. In many practical cases two clicks are enough.

Figure 10A:
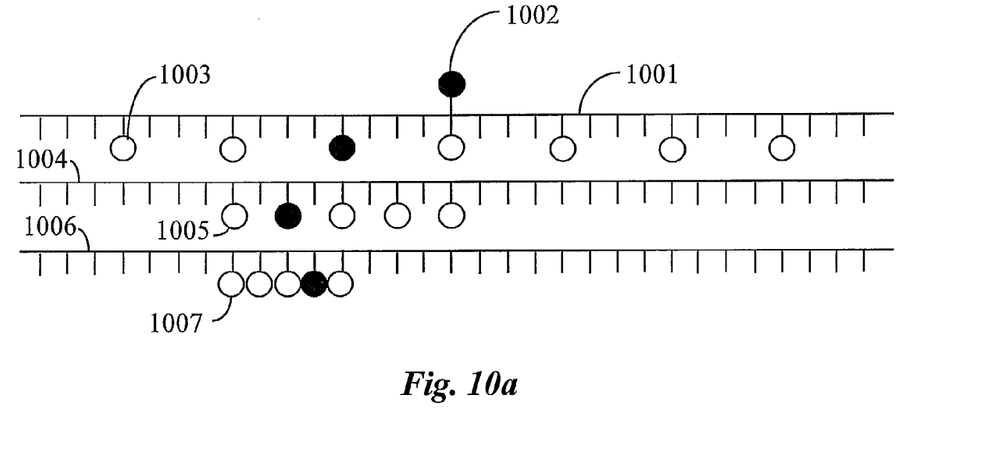
FIG. 10 illustrates in an embodiment of the invention, an attribute change choice-strategy for a user, with illustration of two different choice-paths.
Figure 10B:
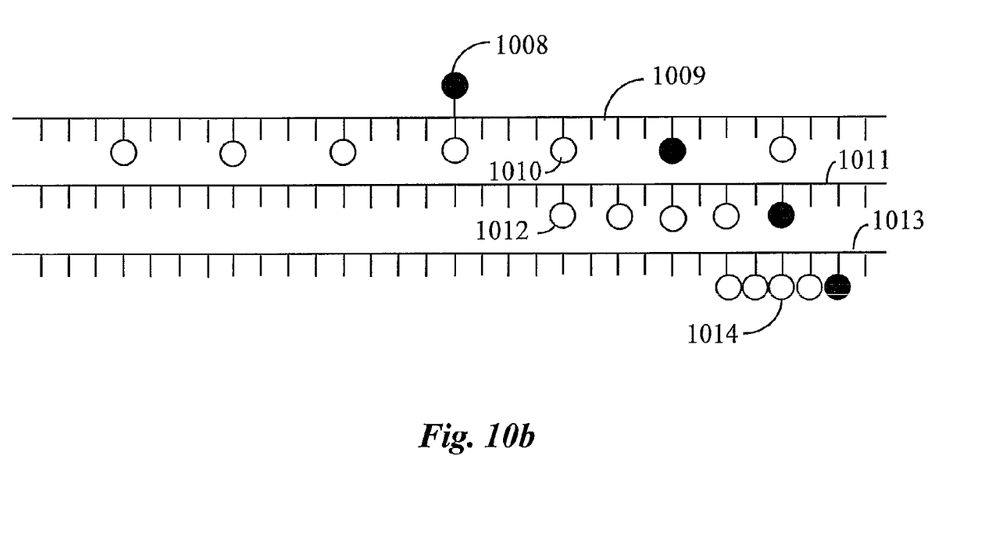

In another way of considering the process, FIGS. 10a and 10b illustrate typical choice-hierarchies for either brightness/contrast or tone/contrast. In FIG. 10a an original image 1002 is shown at the center of a scale 1001, the scale showing a number of increments of JAVDs at either side, representing a complete practical range of the image attribute under choice. Any number of these increments might be appropriate in a practical case. Below scale 1001 the original image and four alternative altered images are shown as images 1003, each of the candidate images for selection separated by four JAVDs. As a first choice the user selects the first image to the left of the original, separated from the original by four JAVDs. That selected image now becomes an image for enhancement relative to scale 1004, which shows four additional candidate altered images 1005, but now separated by two JAVDs each. The user now selects an altered image two JAVDs to the left of the first selected altered image, and the system uses that selection to do a third iteration shown on scale 1006, with candidate alterations 1007 one JAVD apart. The user selects a candidate image one JAVD to the right of the second selected altered image, which is five JAVDs to the left of the original image, and this selection becomes the final selection for the particular attribute being enhanced.

FIG. 10b illustrates another selection hierarchy, beginning with original image 1008 on scale 1009, and the selection proceeds through candidates 1010 on scale 1009, then candidates 1012 on scale 1011, producing finally an image from candidates 1014 on scale 1013, the final image being fourteen JAVDs to the right of the original image.

An important, but not limiting feature of the process just described is that the images presented as choices to the user are, in a first pass, further apart in characteristics (JAVD increment) than in the second pass, and those in the second pass are further apart than in the third pass. The process thus uses hierarchical fine-tuning, which enables the selections a user must make to arrive at the preferred image with the optimum time and efficiency. In one embodiment the natural end point for the process is arriving at a best choice among images that are now one increment (JAVD) apart. There might also be a menu choice for a user to truncate the process in any iteration, or to skip one or more passes in the process, which is a possibility for users having become familiar with the system. It may be, for example, that the brightness and contrast are quite acceptable for an image but the color is considerably out of balance, so in one embodiment there may be a way for a user to do a quick configuration to do a full process, or to limit the process to particular attributes.

Having described the process in one embodiment, comprising three iterations, with three selections, or clicks, for one attribute, such as brightness, following user-selection of the preferred brightness/darkness image state, this selection now appears as an original for a new pass through the iterative selection process for tone/contrast, with candidate altered images being presented and selected just as they were for brightness enhancement. Also, in one embodiment of the invention the system maps and creates images from an original in both directions from the original, with the images one JAVD apart, but presents the images to the user in the hierarchical manner described above, to minimize the selections necessary to arrive at the best image for the particular attribute. But an experienced user may be provided access to all of the images mapped, and in some embodiments there may be functionality for the user to configure the system in a number of different ways.

In a computerized embodiment of the above hierarchal presentation of image states, each choice the user makes can typically be made by a user using, for example, a pointer device, in the order of 1 second, and therefore, assuming the three-levels of choice for each attribute, as illustrated in FIGS. 10a and 10b, the combined preferred overall choices for brightness/darkness and tone/contrast can typically be made in a matter of from six to ten seconds. Note also that in that in this same example, the user will have made a preferred selection from a large number of altered images. The invention in other embodiments may comprise any number of combinations representing practical preference and convenience.

In one embodiment, after the brightness and contrast has been enhanced, the image having the enhanced brightness and contrast becomes an original for color enhancement. In well-known conventional systems each pixel will have more than one value for color. The well-known RGB system, for example, will have one value for red, one for green, and one for blue. A similar plurality of values exist also for color components in a cyan, magenta, yellow system. It is therefore necessary to map in these conventional systems, three separate values for each pixel in enhancing color.

Figure 11:
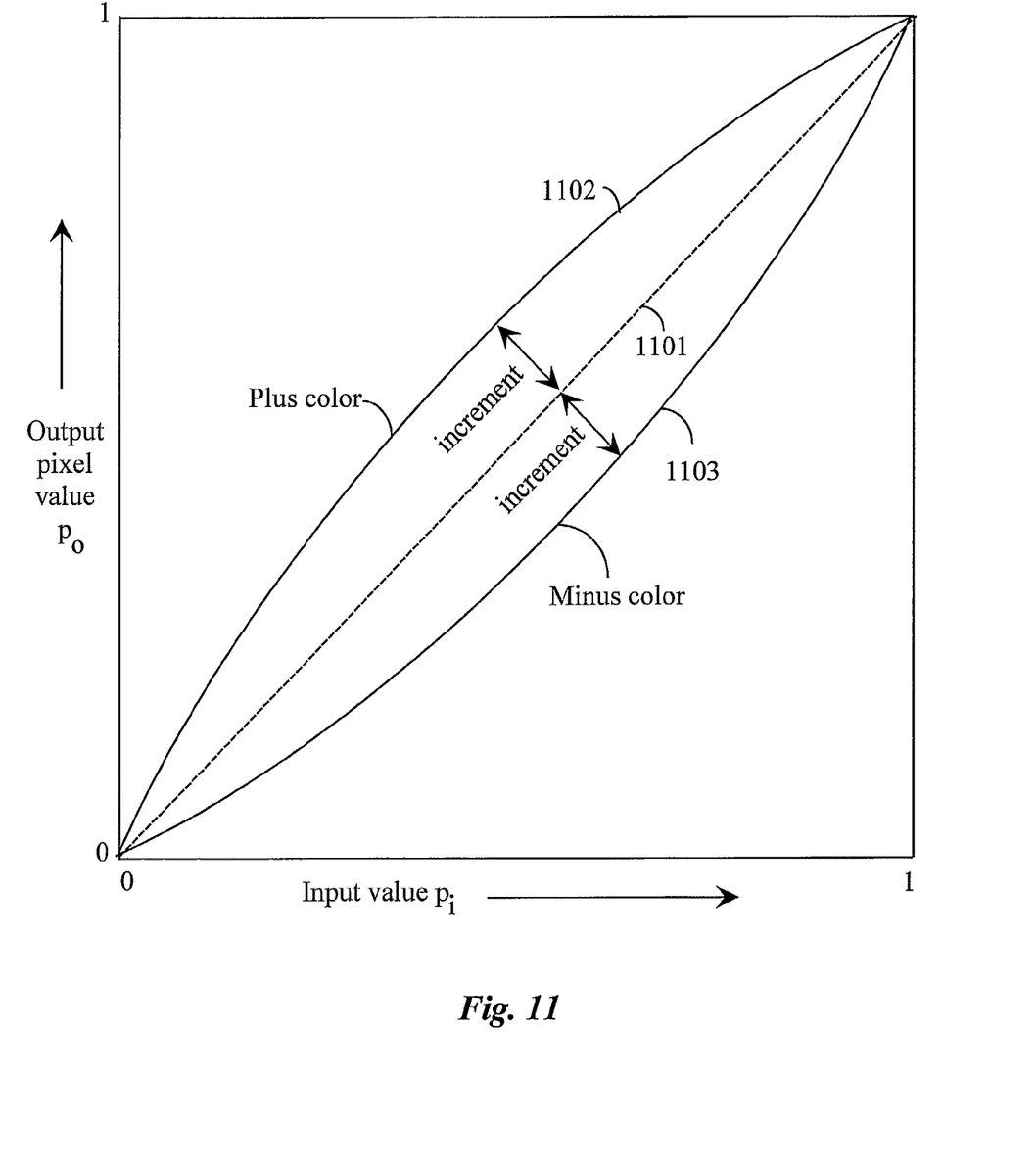
FIG. 11 illustrates in an embodiment of the invention increments and methodology of choice for enhancing color state of an image.

FIG. 11 illustrates increments and methodology of choice for color state of an image. Curves 1102 and 1103 represent a single JAVD in each direction for one color component, for example red. For each color component, such as red, green or blue, the system can (and may in some embodiments) operate just as described above to allow the user to enhance the color of an image through separate enhancement of each color component It is known that in a conventional three-component color system (for example, but not limited to, RGB), independent changes in any two components typically bring about an effective associated visual change in the third. Thus changes of JAVD in any two-color components may form a basis of an overall choice among the color states of the image. So in some embodiments changes may be made, for example, in only two components rather than all three components.

Figure 12:
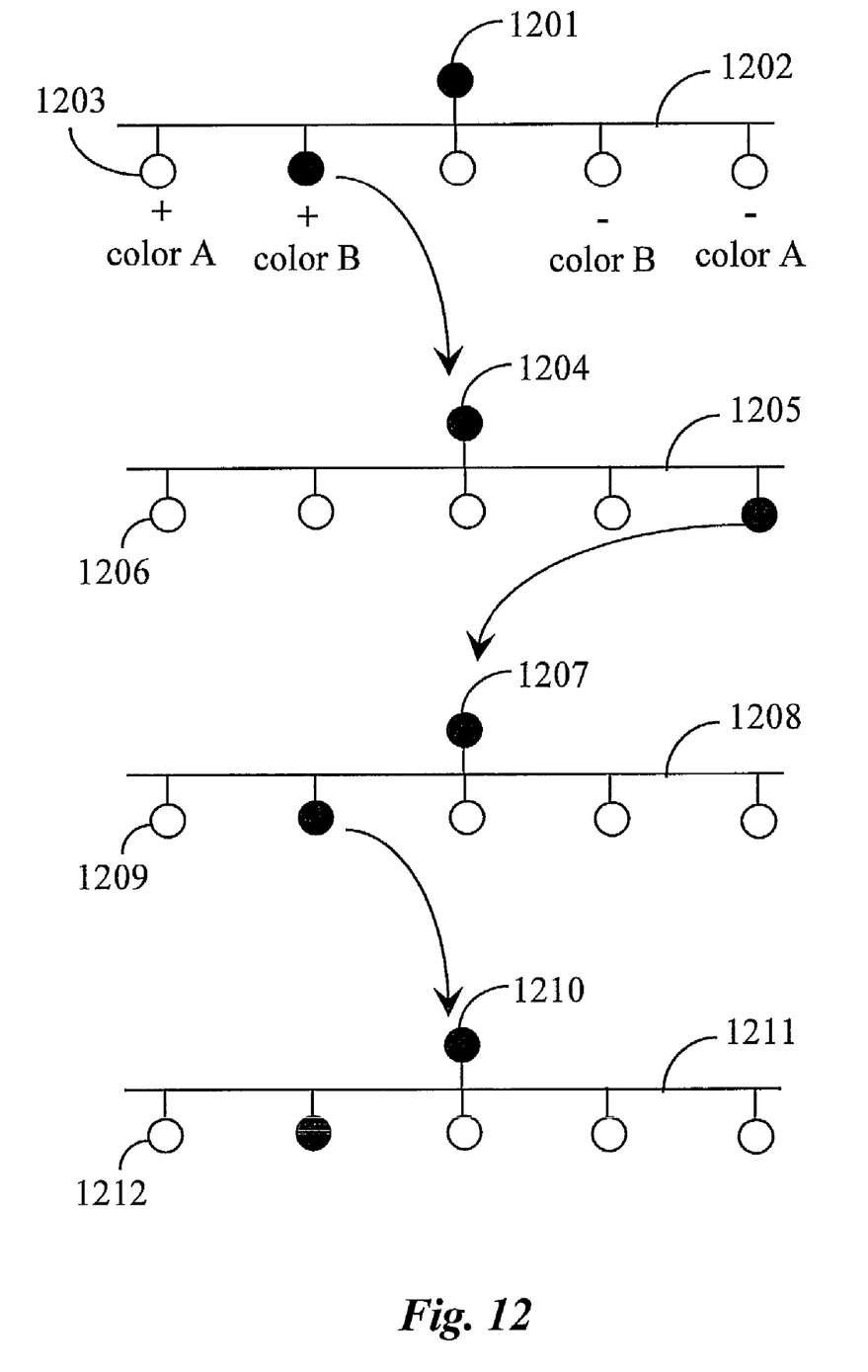
FIG. 12 shows in an embodiment of the invention an iterative hierarchy of color changes available to a user in order to obtain a desirable overall color balance.

FIG. 12 illustrates a choice hierarchy associated with user-preferred color-state selection. An original image 1201 is shown above a row 1202 of smaller images 1203 with plus and minus a single JAVD of two of three color components, denoted here by color A and color B. In one embodiment of the invention A and B might be Red and Blue, but the invention may relate to any other combination of underlying color components. The invention in other embodiments might also include any other practical number of side-by-side thumbnail color alteration choices other than the four shown, or might allow the user choice of simultaneous increments in all color components, as may be deemed practically desirable.

The user choice among color states in row 1202, as shown in shaded circle, becomes the new original 1204, and new color JAVDs 1206 are recomputed from this previous choice and presented to the user along row 1205, with the original 1204 in the center. The procedure continues in this fashion with a new selection from row 1205 becoming a new original 1207, new potentials images displayed in row 1209 with the original in the center position, a new selection that becomes the new original 1210, then new potential images in row 1212 with 1210 in the center. In the embodiment illustrated by FIG. 12, the user selects the original 1210 as the preferred choice, so the process ends here, but continues as long as the original is not judged by the user to be the preferred, therefore not needing improvement. That final image then is saved as the overall color-enhanced image, and, in the situation where enhancement has already been done for brightness and contrast, this image may be the final optimized image in the overall process, as indicated in FIG. 1, image 105. Although FIG. 12 shows four levels of color choice, any other number of iterations may be appropriate in individual cases.

The enhancement procedure described in several examples and in enabling detail above is based on a single pixel mapping function of the form indicated, but not restricted to, that of function (A) and its mirror-image form (C) above, with successive amended images being produced by varying the constant c in the formulas in a systematic way, of which one scheme is provided by formula (B) above. Also the function may be applied in various embodiments to the entire pixel range for all pixel components in original form or as a mirror image; combinations of partial pixel-ranges for all pixel components; or to the entire pixel range for partial pixel components. This invention is, however, not limited to such applications of this specific function to the pixel range and pixel components, nor is it limited to the functionality described in functions (A), (B) or (C). since many others of a similar class of functions may be used to achieve similar altered images for user consideration.

It is noted that the pixel mapping processes described above, incorporating a fundamental set of image-attributes for enhancement, operate globally on the overall pixel array and the pixel components. In many embodiments of the invention none of the mapping operations involve conditional pixel mapping, wherein the operation on an individual pixel or its components depends not only on the values of the pixels, but on those of a defined surrounding population of pixels. Thus all the described pixel mapping operations in these many embodiments avoid associated practical problems of so-called conditional pixel mapping algorithms, wherein unwanted image defects may be introduced by the algorithm itself. Therefore the only defects following enhancement by the procedures described above for these embodiments are those already existing in the original image, for example as introduced previously by the hardware and software limitations of the camera, scanner, or other device by which the image originated. In some embodiments of the invention, however, conditional pixel mapping algorithms might well be employed in combination with procedures described in various example described above.

It is understood that while the image attributes described above in the basic enhancement procedure, these being brightness, contrast and color, form a basic collective set of image quality states, other more sophisticated image attributes may be added to this hierarchy as appropriate and necessary in other embodiments. One embodiment of this invention, for example, includes additional image attributes such as, but not be limited to, image-sharpening, noise-reduction, and brightness/darkness latitude-extension. Such image attributes typically involve conditional pixel mapping, which may not be reversible. However, for these attributes the basic methodology also extends to, and involves, definition of linear visual scales, and the definition of approximately equal increments on these scales, in terms of their JAVDs across a practical range for each attribute.

Further to the above it will be apparent to the skilled person that there may be many alterations in the embodiments described within the spirit and scope of the invention. For example, mapping functions and image-choice methodology may vary in different embodiments. Also, the methodology of the invention is independent of and applicable to all known image formats, including but not limited to those of jpg, tif, gif and bmp formats, and so on. Further still, although the above descriptions have been concerned with the image-quality enhancement of single digital images, also known as still images, the methodology is also applicable to other digital-imaging modalities, for example but not limited to, frame-by-frame enhancement of video broadcasts, or off-line or real-time batch processing of such images. Further still, although the invention has been described above as applicable to consumer fields such as digital photography, it is understood that it is not limited to these and similar consumer fields, but is also relevant and applicable to digital images as might be typical in applications such as, but not limited to, those occurring in medical diagnostics or aerial reconnaissance, whereby the image size and other fundamental image parameters may be quite different from those described and illustrated as embodiments and examples above. There are similarly many other alterations within the spirit and scope of the invention, so the invention is limited only by the breadth and scope of the claims that follow.

What is claimed is:

1. A method enhancing a digital image, comprising the steps of:
    (a) using software executing from a machine-readable physical medium on a computerized appliance, selecting a digital image as an original image to be enhanced, wherein pixel values for an image attribute in the original image range from zero to a maximum value;
    (b) normalizing pixel values in the original image to values between 0 and 1 proportionally;
    (b) calculating new normalized pixel values for a first altered image using an equation $p_o=p_i/(1-C+Cp_i)$ where $p_o$ is a new normalized (output) pixel value for the first altered image, generated from $p_i$, which is an original (input) pixel value at the same image location, and a value $C_1$ is selected for constant C in the equation, $C_1$ having a value between 0 and 1 inclusive, which, once selected, remains the same for generating all normalized pixel values for the first altered image;
    c) calculating new normalized pixel values for a second altered image using the same equation and procedure as for the first altered image, with a value $C_2$ selected for constant C, also between 0 and 1 inclusive, but unequal $C_1$;
    d) producing actual pixel values for the first and second altered images from the calculated normalized values;
    e) displaying the first and second altered images to a user for selection;
    f) selecting one of the first and second altered images by the user as preferable.

2. The method of claim 1 wherein the image selected by the user in step (f) is taken as a new original image in step (a), and the procedure of claim 1 is repeated.

3. The method of claim 2 wherein the user signals a final approval for the altered digital image in the first attribute.

4. The method of claim 1 wherein the image attribute is brightness.

5. The method of claim 3 wherein the image attribute is brightness, the attribute is changed from brightness to contrast after the user final approval for brightness, and the method is repeated until the user signals a final approval for contrast.

6. The method of claim 5 wherein the image attribute is changed to color after user approval for contrast, and the method is repeated until the user signals approval for color.

7. The method of claim 1 wherein an increment i is selected as a first approximation of $C_1$, $2i$ as a first approximation of $C_2$, $C_1$ is calculated as $C_1=1-(1-i)^{2.85}$, and $C_2$ is calculated as $C_2=1-(1-2i)^{2.85}$.

8. The method of claim 7 wherein a series of n altered images is created using first approximations for C of 1i, 2i, 3i . . . ni, and resulting values of $C_1$, $C_2$, $C_3$ . . . $C_n$ for calculating output pixel values for each altered image, wherein C values are calculated as $Cn=1-(1-ni)^{2.85}$, the series of altered images displayed to the user for selection of one as preferable.

* * * * *